(12) United States Patent
Moriya et al.

(10) Patent No.: US 12,159,222 B2
(45) Date of Patent: Dec. 3, 2024

(54) NEURAL NETWORK LEARNING APPARATUS, NEURAL NETWORK LEARNING METHOD AND PROGRAM

(71) Applicant: NIPPON TELEGRAPH AND TELEPHONE CORPORATION, Tokyo (JP)

(72) Inventors: Takafumi Moriya, Kanagawa (JP); Yoshikazu Yamaguchi, Kanagawa (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 1077 days.

(21) Appl. No.: 17/050,265

(22) PCT Filed: Apr. 23, 2019

(86) PCT No.: PCT/JP2019/017216
§ 371 (c)(1),
(2) Date: Oct. 23, 2020

(87) PCT Pub. No.: WO2019/208564
PCT Pub. Date: Oct. 31, 2019

(65) Prior Publication Data
US 2021/0081792 A1 Mar. 18, 2021

(30) Foreign Application Priority Data
Apr. 26, 2018 (JP) .................................. 2018-084760

(51) Int. Cl.
*G06N 20/00* (2019.01)
*G06N 3/08* (2023.01)

(52) U.S. Cl.
CPC ...................................... *G06N 3/08* (2013.01)

(58) Field of Classification Search
CPC ........... G06N 3/08; G06N 3/047; G06N 3/082
See application file for complete search history.

(56) References Cited

U.S. PATENT DOCUMENTS

2016/0040236 A1\* 2/2016 Hosur .................. C12Q 1/6883
435/6.12
2018/0121814 A1\* 5/2018 Yu ............................ G06N 3/04
(Continued)

OTHER PUBLICATIONS

Foo, Chuan-sheng, and Andrew Ng. "Efficient multiple hyperparameter learning for log-linear models." Advances in neural information processing systems 20 (2007) (Year: 2007).\*
(Continued)

*Primary Examiner* — Andrew T McIntosh (57) ABSTRACT

There is provided a neural network learning apparatus capable of adjusting an amount of reduction in a model size. A group parameter generating part grouping model parameters of a neural network model into arbitrarily defined groups and generating group parameters indicating features of the groups, a regularization term calculating part calculating a regularization term on an assumption that distribution of the group parameters is according to distribution defined by hyper parameters which are parameters defining distribution features, and a model updating part calculating a loss function from correct labels in teacher data, output probability distribution obtained by inputting feature values corresponding to the correct labels in the teacher data to the neural network model, and a regularization term, and updating the neural network model in a manner that a value of the loss function is decreased are included.

8 Claims, 11 Drawing Sheets

(56) References Cited

U.S. PATENT DOCUMENTS

2018/0316776 A1* 11/2018 Lu .......................... G06Q 50/01
2019/0114544 A1* 4/2019 Sundaram ............... G06F 18/24
2019/0130308 A1* 5/2019 Chickering ............ G06N 20/00
2020/0285939 A1* 9/2020 Baker ...................... G06N 3/04

OTHER PUBLICATIONS

Demyanov, Sergey. Regularization methods for neural networks and related models. Diss. University of Melbourne, Department of Computing and Information Systems, 2015 (Year: 2015).*
Kang, Guoliang, Jun Li, and Dacheng Tao. "Shakeout: a new approach to regularized deep neural network training." IEEE transactions on pattern analysis and machine intelligence 40.5 (2017): 1245-1258 (Year: 2017).*
Scardapane et al. (2016) "Group Sparse Regularization for Deep Neural Networks," v1, Jul. 2, 2016, pp. 1-10, [online], [retrieved on Jun. 10, 2019], Internet: <URL:https://arxiv.org/pdf/1607.00485.pdf>, <DOI: 10.1016/j.neucom.2017.02.029>.
Xu et al. (2015) "Bayesian Variable Selection and Estimation for Group Lasso," Bayesian Analysis v1, Dec. 3, 2015, pp. 909-936, [online], [retrieved on Jun. 10, 2019], Internet: <URL:https://arxiv.org/pdf/1512.01013.pdf>, <Doi: 10.1214/14-BA929>.
Hinton et al. (2012) "Deep Neural Networks for Acoustic Modeling in Speech Recognition," IEEE Signal Processing Magazine, vol. 29, No. 6, pp. 82-97.
Ochiai et al. (2017) "Automatic Node Selection for Deep Neural Networks Using Group Lasso Regularization," ICASSP, pp. 5485-48.

* cited by examiner

NEURAL NETWORK LEARNING APPARATUS, NEURAL NETWORK LEARNING METHOD AND PROGRAM

CROSS-REFERENCE TO RELATED APPLICATIONS

This application is a U.S. 371 Application of International Patent Application No. PCT/JP2019/017216, filed on 23 Apr. 2019, which application claims priority to and the benefit of JP Application No. 2018-084760, filed on 26 Apr. 2018, the disclosures of which are hereby incorporated herein by reference in their entireties.

TECHNICAL FIELD

The present invention relates to a neural network learning apparatus that sparsely learns model parameters of a neural network, a neural network learning method and a program.

BACKGROUND ART

<Prior-Art Technique 1>

As an example of a general neural network learning method, Non-patent literature 1 is disclosed. Hereinafter, this learning method will be referred to as a prior-art technique 1. In the clause of "TRAINING DEEP NEURAL NETWORKS" of Non-patent literature 1, a method for learning a neural network type acoustic model for speech recognition (hereinafter also referred to simply as "an acoustic model" or simply as "a model") is disclosed.

In the prior-art technique 1, pairs (teacher data) of a feature value (a real vector) extracted from each sample of learning data beforehand and a correct unit identification number (a correct label) corresponding to each of the feature value, and an appropriate initial model are prepared. As the initial model, a neural network in which a random number is assigned to each parameter, a neural network that has been already leaned with different learning data or the like can be used.

Figure 1:
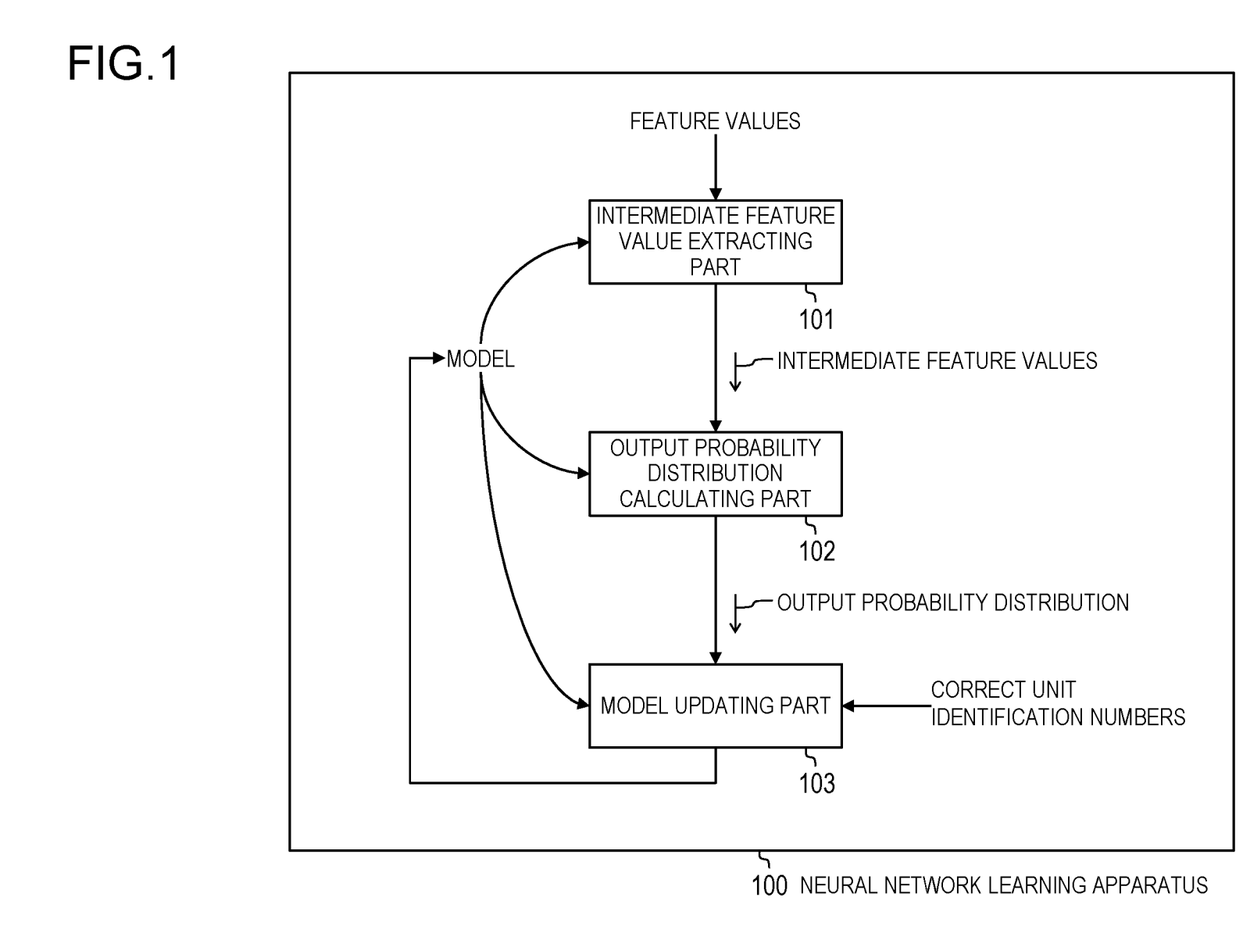
FIG. 1 is a block diagram showing a configuration of a neural network learning apparatus of a prior-art technique 1.

A configuration of a neural network learning apparatus 100 that executes the neural network learning method of the prior-art technique 1 will be described below with reference to FIG. 1. As shown in FIG. 1, the neural network learning apparatus 100 is in a configuration including an intermediate feature value extracting part 101, an output probability distribution calculating part 102 and a model updating part 103. An operation of each component will be described below with reference to FIG. 2.

Figure 2:
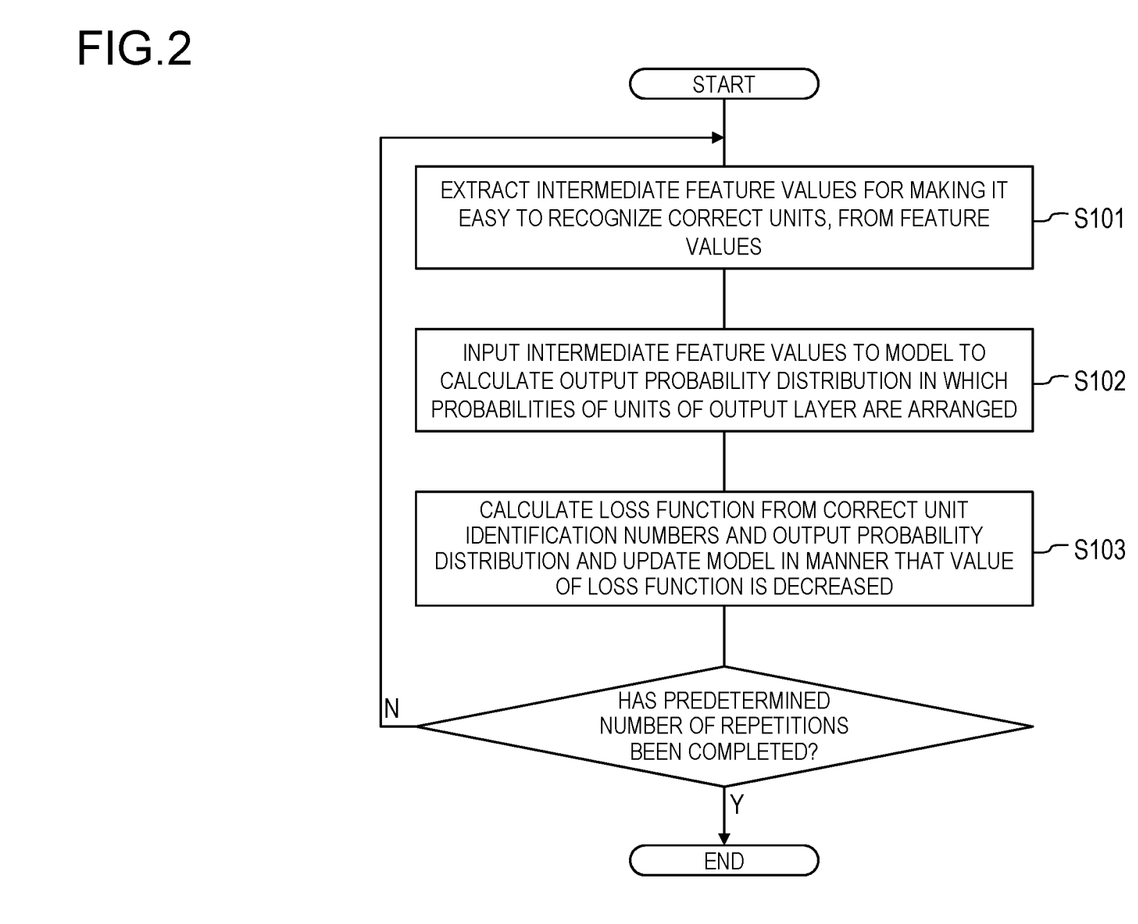
FIG. 2 is a flowchart showing an operation of the neural network learning apparatus of the prior-art technique 1.

[Intermediate Feature Value Extracting Part 101]
Input: feature values
Output: intermediate feature values
Process:
The intermediate feature value extracting part 101 extracts intermediate feature values (Formula (1) of Non-patent literature 1) for making it easy for the output probability distribution calculating part 102 to identify correct units, from inputted feature values (S101). This intermediate feature value extracting part 101 is constructed by a neural network with a plurality of layers, and calculation for extracting an intermediate feature value is performed the same number of times as the number of layers.

[Output Probability Distribution Calculating Part 102]
Input: the intermediate feature values
Output: output probability distribution
Process:

The output probability distribution calculating part 102 inputs the intermediate feature values extracted by the intermediate feature value extracting part 101 to a present model to calculate output probability distribution in which probabilities of units of an output layer are arranged (Formula (2) of Non-patent literature 1) (S102).

In the case of speech recognition, this output probability distribution calculating part 102 calculates which speech output symbol (which phoneme state) each of the intermediate feature values making it easy to identify feature values of speech is, and obtains output probability distribution corresponding to feature values of inputted speech.

[Model Updating Part 103]
Input: a model (before being updated), the output probability distribution and correct unit identification numbers
Output: the model (after being updated)
Process:

The model updating part 103 calculates a loss function $L(w)=E(w)$ (Formula (3) of Non-patent literature 1) from correct unit identification numbers and the output probability distribution obtained from the output probability distribution calculating part 102, and updates a model (by Formula (4) of Non-patent literature 1) in a manner that a value of the loss function $L(w)=E(w)$ is decreased (S103).

Parameters in the neural network model to be updated (hereinafter referred to as model parameters) are a weight w and a bias b of Formula (1) of Non-patent literature 1. The above process of extraction of intermediate feature value→calculation of output probability distribution→update of model is repeated for each pair of a learning data feature value and a correct unit identification number, and the model at a time point when a predetermined number of repetitions (usually, tens of millions of repetitions to hundreds of millions of repetitions) has been completed is used as a learned model.

<Prior-Art Technique 2>

In comparison, in Non-patent literature 2, a method of performing learning while reducing a model size in a neural network is shown. Hereinafter, this learning method will be referred to as a prior-art technique 2.

A loss function in general neural network learning is represented by the following formula:

$$L(w)=E(w)$$

Here, E(w) is C in Formula (3) of Non-patent literature 1, and w is a model parameter that the intermediate feature value extracting part 101 and the output probability calculating part 102 learn in the prior-art technique 1. In the Non-patent literature 2, such learning is performed that, by applying regularization to the above formula, a part of model parameters of a neural network become sparse (values close to 0). In the prior-art technique 2, a model parameter updating part is called a sparse model updating part. The sparse model updating part executes update of a model by a formula obtained by adding a regularization term to a general loss function:

$$L(w)=E(w)+\lambda R(w)$$

The second term $\lambda R(w)$ of this formula is the regularization term, and, in Non-patent literature 2, regularization terms called Ridge (L2) and Group Lasso are used. Here, $\lambda$ is a hyper parameter for adjusting influence of the regularization terms. Regularization terms of L2 ($R_{L2}(w)$) and Group Lasso($R_{group}(w)$) in the case of updating only the weight parameter w for each layer 1 are shown below.

$$R_{L2}(w) = \frac{1}{2}\|w^l\|^2 \quad \text{[Formula 1]}$$

$$R_{group}(w) = \sum_{j=1}^{N_{l-1}} \|w_j^l\| $$

It is possible to perform arbitrary grouping among parameters in Group Lasso, and, in Non-patent literature 2, the unit of a group is neural network elements (each row or column of a matrix W). In $R_{group}(w)$, $$\sum_{j=1}^{N_{l-1}} \|w_j^l\| \quad \text{[Formula 2]}$$

represents a sum of weights that are parameters between one element of each l layer and all elements (j=1, ..., $N_{l-1}$) of an l−1 layer.

The regularization term is originally a technique to avoid overlearning, and various regularization terms exist according to purposes. In Formula (2) of Non-patent literature 2, Group Lasso and Ridge (L2) are used. In Non-patent literature 2, it is disclosed that learning is performed in a manner that each group decided by a user (example: each row of a matrix is grouped) becomes sparse by using Group Lasso, and that the size of the whole model is reduced by deleting model parameters of groups having values smaller than a threshold decided by the user from model parameters after learning.

Figure 3:
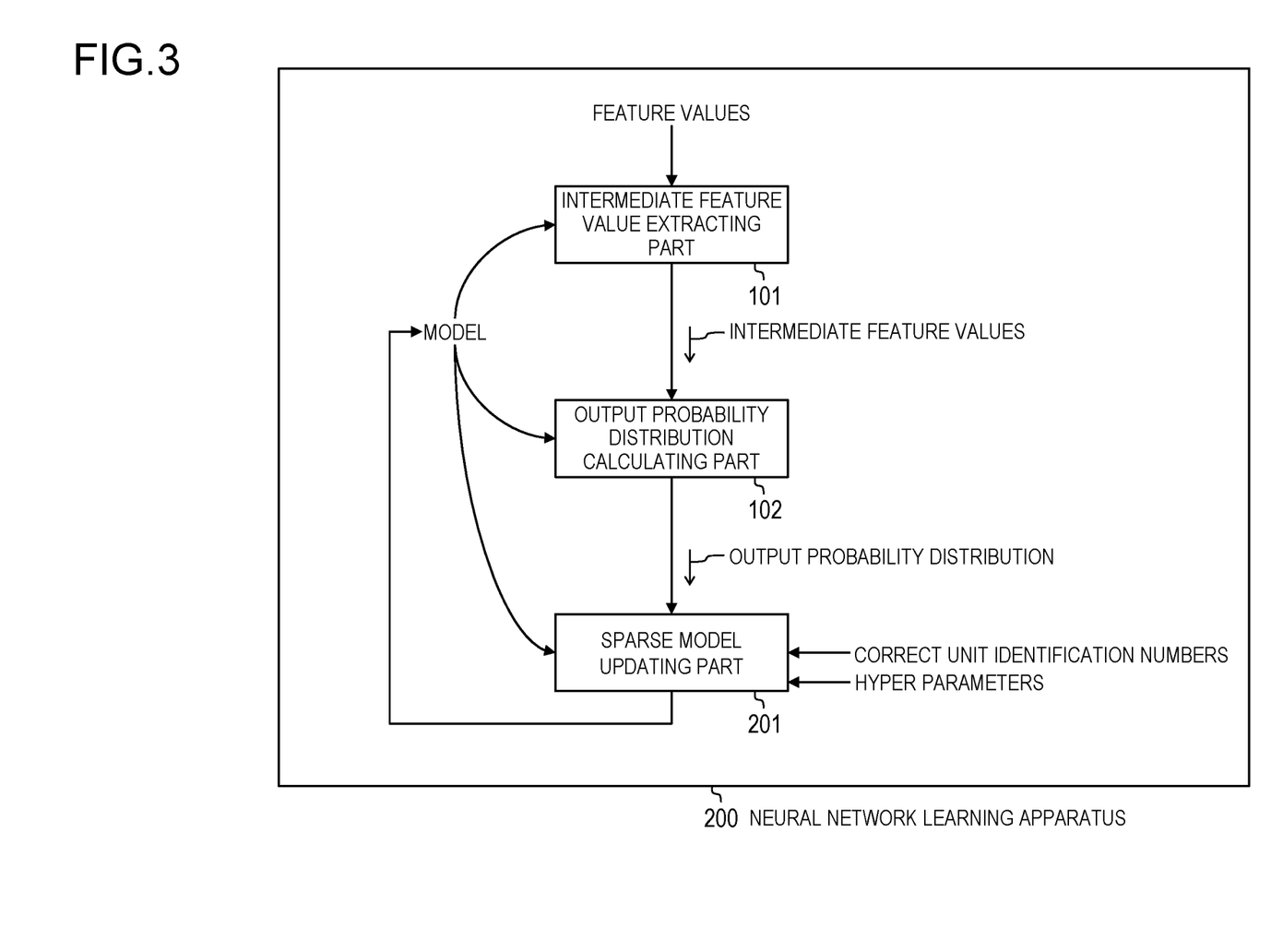
FIG. 3 is a block diagram showing a configuration of a neural network learning apparatus of a prior-art technique 2.

A configuration of a neural network learning apparatus 200 that executes the neural network learning method of the prior-art technique 2 will be described below with reference to FIG. 3. As shown in FIG. 3, the neural network learning apparatus 200 includes the intermediate feature value extracting part 101, the output probability distribution calculating part 102, and a sparse model updating part 201. The intermediate feature value extracting part 101 and the output probability distribution calculating part 102 execute the same operations as the components with the same names of the prior-art technique 1. An operation of the sparse model updating part 201 will be described below with reference to FIG. 4.

Figure 4:
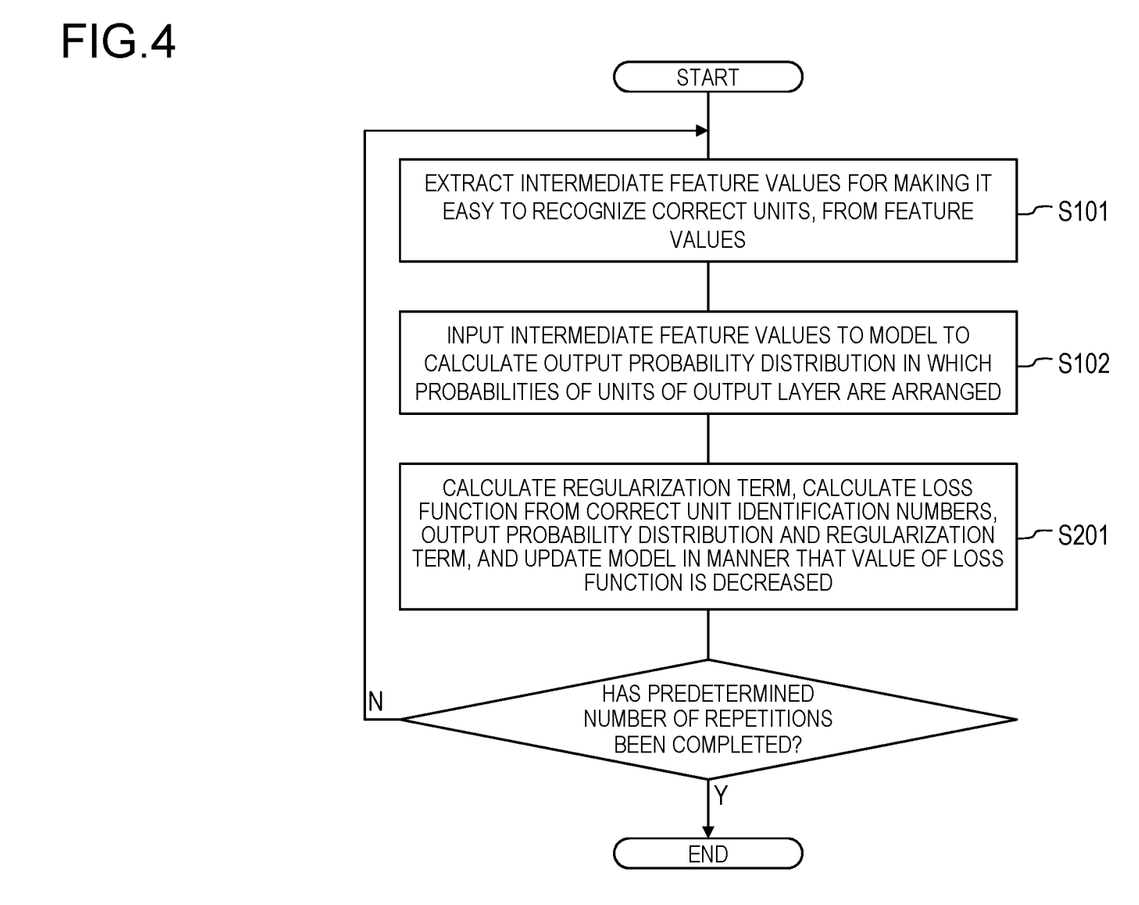
FIG. 4 is a flowchart showing an operation of the neural network learning apparatus of the prior-art technique 2.

[Sparse Model Updating Part 201]
  Input: a model (before being updated), output probability distribution and
  correct unit identification numbers and hyper parameters
  Output: a sparse model (after being updated)
  Process:
  The sparse model updating part 201 calculates a regularization term $\lambda R(w)$, calculates a loss function from correct unit identification numbers, output probability distribution and the regularization term $\lambda R(w)$, updates a model in a manner that a value of the loss function is reduced, and outputs a model that is sparser than a model obtained by the model updating part 103 that does not perform regularization (S201). The loss function in the case of using the regularization term is shown below:

$$L(w)=E(w)+\lambda R(w)$$

Figure 5:
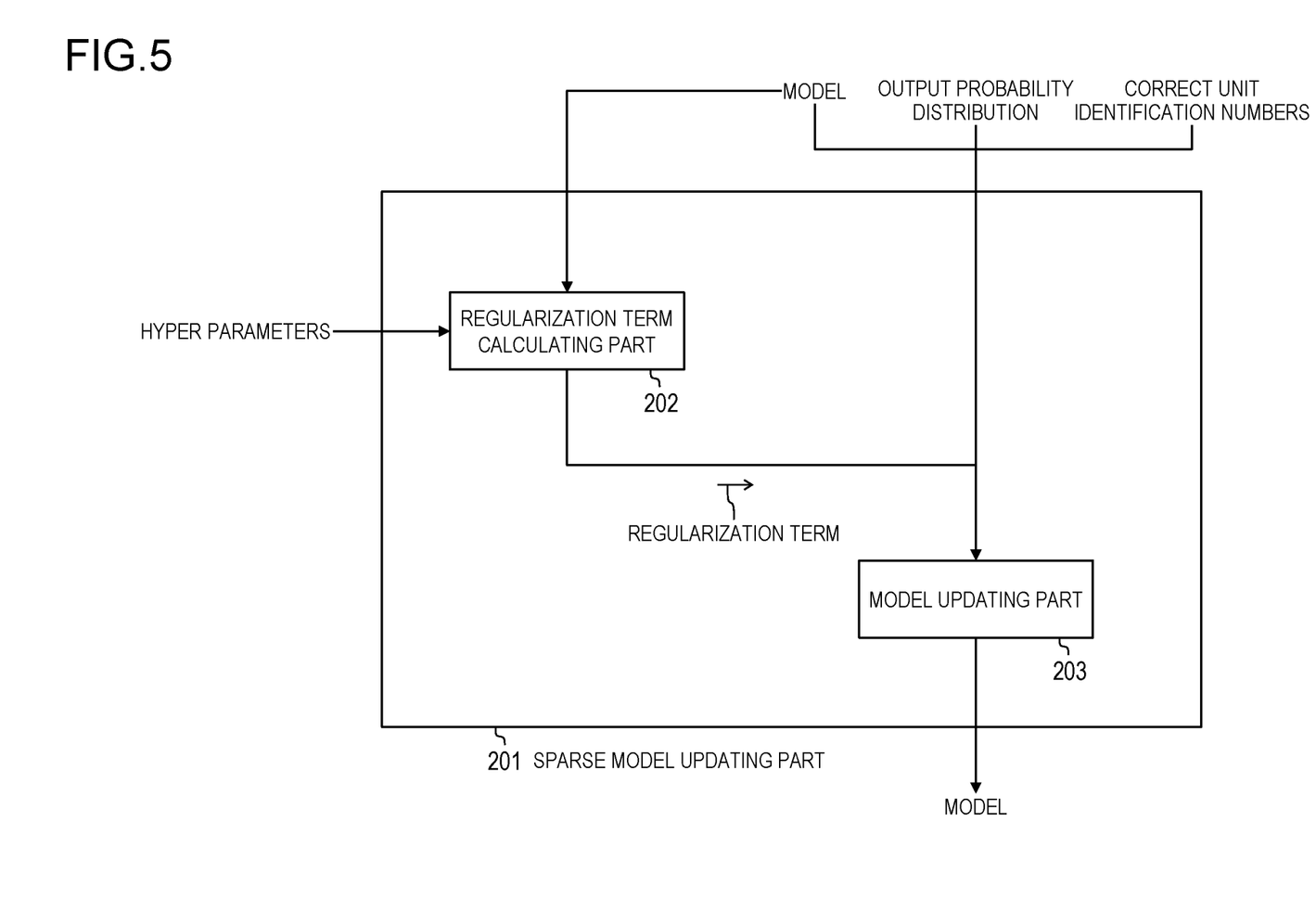
FIG. 5 is a block diagram showing a configuration of a sparse model updating part of the prior-art technique 2.

Details of the sparse model updating part 201 will be described below with reference to FIG. 5. As shown in FIG. 5, the sparse model updating part 201 is in a configuration including a regularization term calculating part 202 and a model updating part 203. An operation of each component in the sparse model updating part 201 will be described below with reference to FIG. 6.

Figure 6:
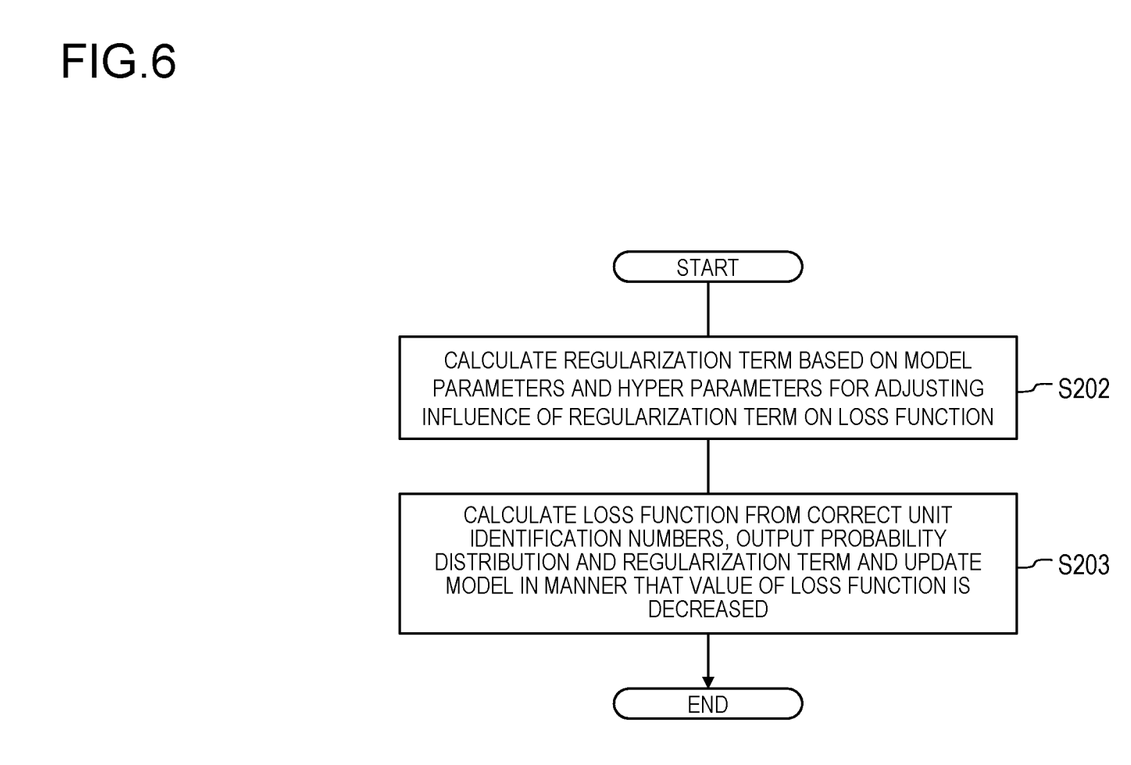
FIG. 6 is a flowchart showing an operation of the sparse model updating part of the prior-art technique 2.

[Regularization Term Calculating Part 202]
  Input: the model (before being update) and the hyper parameters
  Output: a regularization term
  Process:
  The regularization term calculating part 202 calculates a regularization term $\lambda R(w)$ based on model parameters and a hyper parameter $\lambda$ for adjusting influence on a loss function (S202). Here, R(w) is calculated from the inputted model parameters, and is L2 in Non-patent literature 2.

$$R_{L2}(w)=\tfrac{1}{2}\|w^l\|^2 \quad \text{[Formula 3]}$$

and Group Lasso $$R_{group}(w)=\sum_{j=1}^{N_{l-1}}\|w_j^l\| \quad \text{[Formula 4]}$$

are used. As the regularization term, the hyper parameter $\lambda$ for adjusting influence on a loss function is used.

[Model Updating Part 203]
  Input: the model (before being updated), the output probability distribution, correct unit identification numbers, and the regularization term
  Output: the model (after being updated)
  Process:
  The model updating part 203 calculates a loss function from correct unit identification numbers (correct labels in teacher data), output probability distribution obtained by inputting intermediate feature values corresponding to the correct unit identification numbers (the correct labels in teacher data) to the neural network model, and the regularization term, and updates the neural network model in a manner that a value of the loss function L(w)=E(w)+$\lambda$R(w) is decreased (S203).

PRIOR ART LITERATURE

Non-Patent Literature

Non-patent literature 1: Geoffrey Hinton, Li Deng, Dong Yu, George E. Dahl, Abdel-rahman Mohamed, Navdeep Jaitly, Andrew Senior, Vincent Vanhoucke, Patric Nguyen, Tara N. Sainath and Brian Kingsbury, "Deep Neural Networks for Acoustic Modeling in Speech Recognition," IEEE Signal Processing Magazine, Vol. 29, No 6, pp. 82-97, 2012.

Non-patent literature 2: T. Ochiai, S. Matsuda, H. Watanabe, and S. Katagiri, "Automatic Node Selection for Deep Neural Networks Using Group Lasso Regularization." ICASSP, pp. 5485-48, 2017.

SUMMARY OF THE INVENTION

Problems to be Solved by the Invention

In the prior-art technique 1, construction of a model is performed based on a specified number of parameters in neural network learning. In other words, a size of the constructed model depends on a designer. However, unnecessary parameters exist inside the model, and there is a problem that it is costly in terms of the model size and an amount of calculation to construct a speech recognition system to locally operate (a problem 1).

Figure 11A:
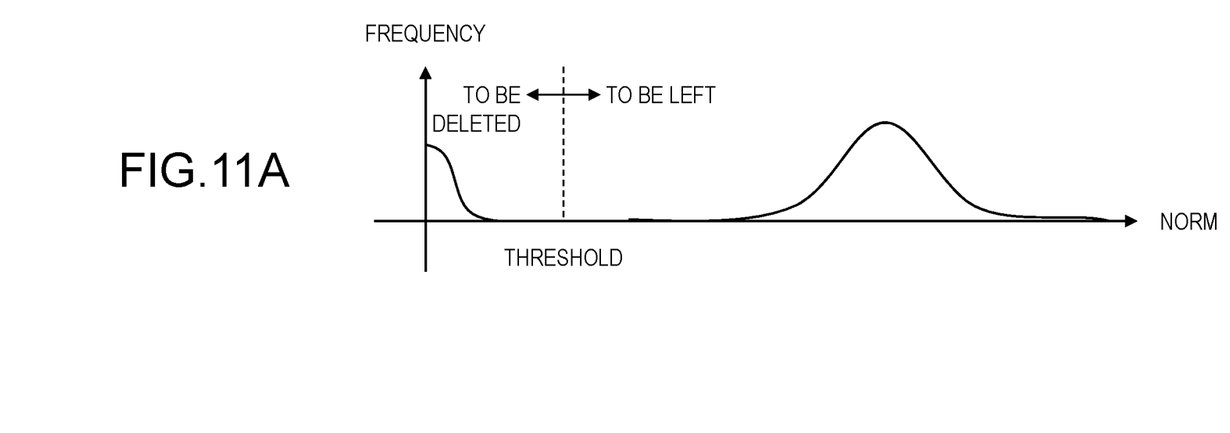
FIG. 11A is a diagram showing an outline of model parameter deletion of the neural network learning apparatus of the prior-art technique 2.

For this problem 1, a method of reducing the model size by reducing unnecessary model parameters (values close to 0) while learning a model as conventionally is proposed in the prior-art technique 2. In normal L2 regularization (described above), a total of values of parameters becomes small (elements of a matrix close to 0 increases). However, since deletion of a whole row or column cannot be performed, it is not possible to reduce the model size and the amount of calculation. In the prior-art technique 2, each row or column is grouped by using Group Lasso (described above) that causes a value of a norm for each group to be close to 0, and reduction in the model size and the amount of calculation is realized by deleting such a row or column that the value of the norm is close to 0 after learning. Specifically, in Group Lasso, each row or column is grouped, and, as shown in FIG. 11A, frequency when the value of the norm is calculated for each group is regarded as distribution. A value corresponding to a boundary between distributions is considered as a threshold, and the model size is reduced by deleting model parameters corresponding to rows or columns corresponding to groups with norms smaller than the threshold. At this time, there is a problem that, since it is not possible to adjust the frequency distribution of the values of the norms in Group Lasso, it is not possible to adjust the number of model parameters to be deleted (a problem 2). According to the problem 2, it is difficult to adjust the amount of reduction in the model size by the neural network model size reduction method using Group Lasso in the current situation.

Therefore, in the present invention, an object is to provide a neural network learning apparatus capable of adjusting the amount of reduction in the model size.

Means to Solve the Problems

A neural network learning apparatus of the present invention includes a group parameter generating part, a regularization term calculating part and a model updating part.

The group parameter generating part groups model parameters of a neural network model into arbitrarily defined groups, and generates group parameters indicating features of the groups.

The regularization term calculating part calculates a regularization term on an assumption that group parameter distribution is according to distribution defined by hyper parameters which are parameters defining distribution features.

The model updating part calculates a loss function from correct labels in teacher data, output probability distribution obtained by inputting feature values corresponding to the correct labels in the teacher data to the neural network model, and the regularization term, and updates the neural network model in a manner that a value of the loss function is decreased.

Effects of the Invention

According to a neural network learning apparatus of the present invention, it is possible to adjust an amount of reduction in a model size.

BRIEF DESCRIPTION OF THE DRAWINGS

FIG. 11 is a conceptual diagram illustrating difference between the neural network learning apparatuses of the prior-art technique 2 and the first embodiment.

DETAILED DESCRIPTION OF THE EMBODIMENT

An embodiment of the present invention will be described below in detail. Note that component parts having the same function will be given the same reference number, and duplicated description will be omitted.

First Embodiment

In a neural network learning apparatus of a first embodiment, the regularization technique of the prior-art technique 2 is improved. Though the amount of reduction in the model size cannot be defined in the prior-art technique 2, it is possible in the neural network learning apparatus of the first embodiment to adjust the amount of reduction in the model size by introducing parameters that influence the amount of reduction in the model size.

Figure 7:
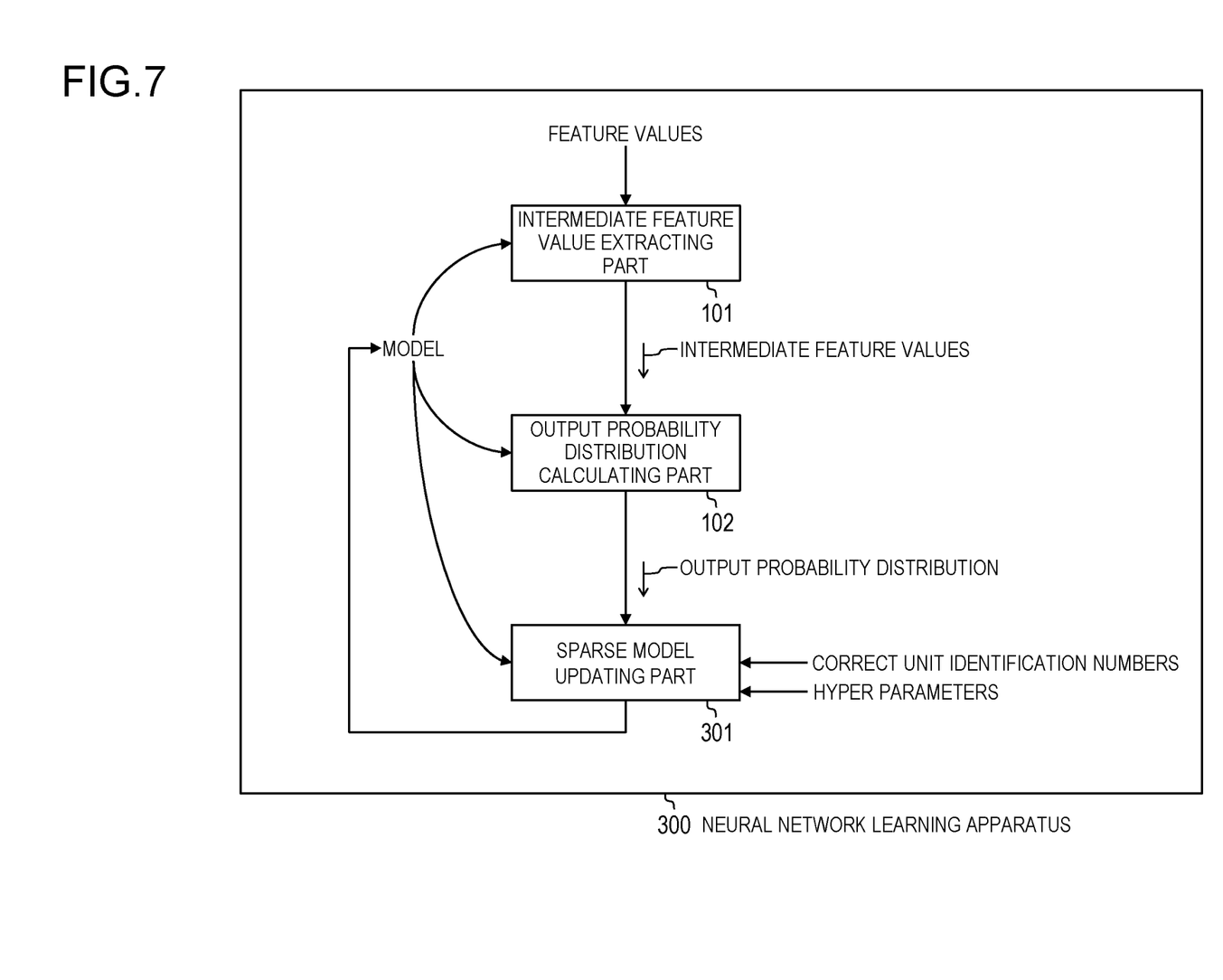
FIG. 7 is a block diagram showing a configuration of a neural network learning apparatus of a first embodiment.

A configuration of a neural network learning apparatus 300 of the first embodiment will be described below with reference to FIG. 7. As shown in FIG. 7, the neural network learning apparatus 300 includes the intermediate feature value extracting part 101, the output probability distribution calculating part 102, and a sparse model updating part 301. The intermediate feature value extracting part 101 and the output probability distribution calculating part 102 execute the same operations as the components with the same names of the prior-art technique 1 and the prior-art technique 2. An operation of the sparse model updating part 301 will be described below with reference to FIG. 8.

Figure 8:
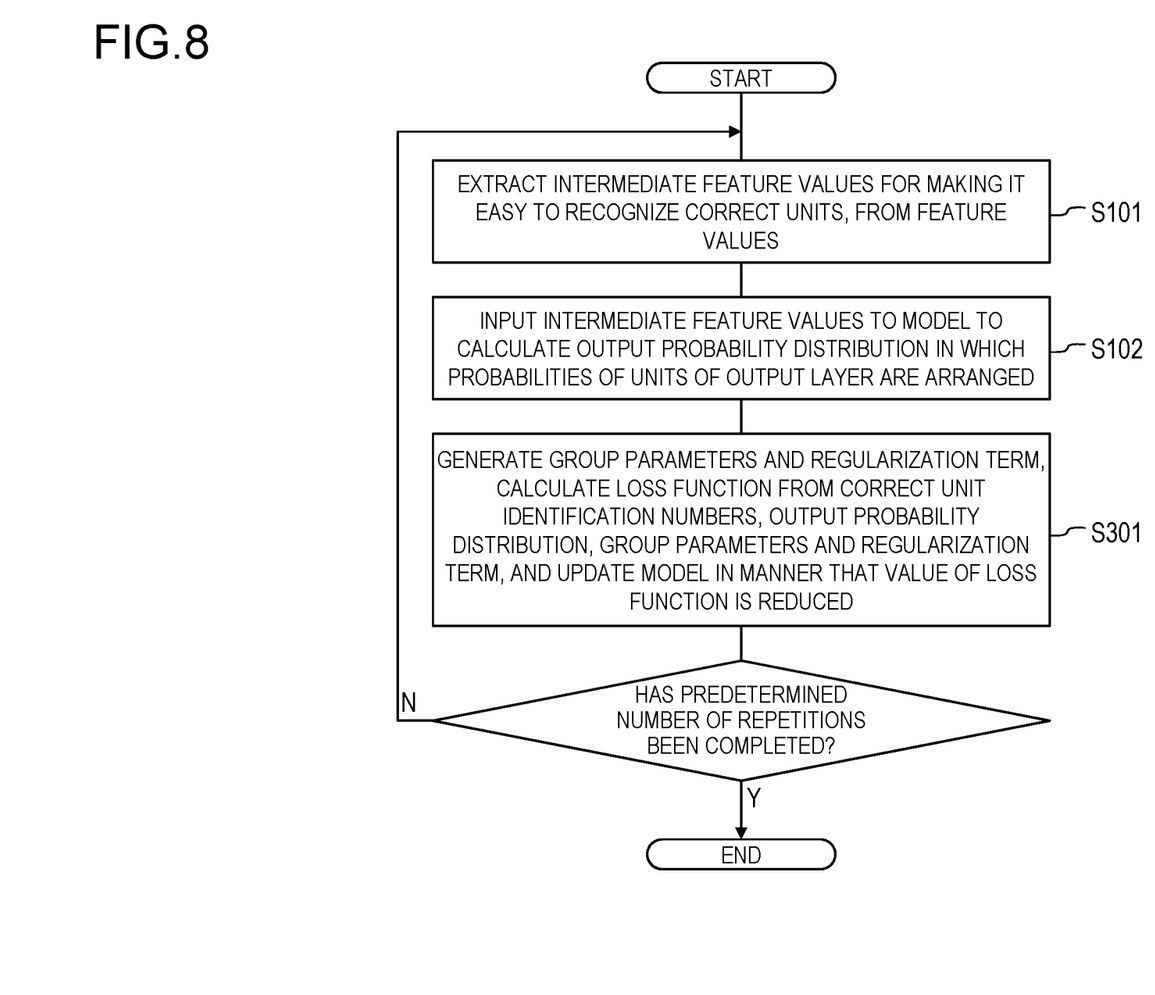
FIG. 8 is a flowchart showing an operation of the neural network learning apparatus of the first embodiment.

[Sparse Model Updating Part 301]

Input: a model (before being updated), output probability distribution and correct unit identification numbers Output: a sparse model (after being updated)

Process:

The sparse model updating part 301 generates group parameters and a regularization term λR(w), calculates a loss function from correct unit identification numbers, output probability distribution, the group parameters and the regularization term λR(w), updates a model in a manner that a value of the loss function is reduced, and outputs a sparse model (S301).

Figure 9:
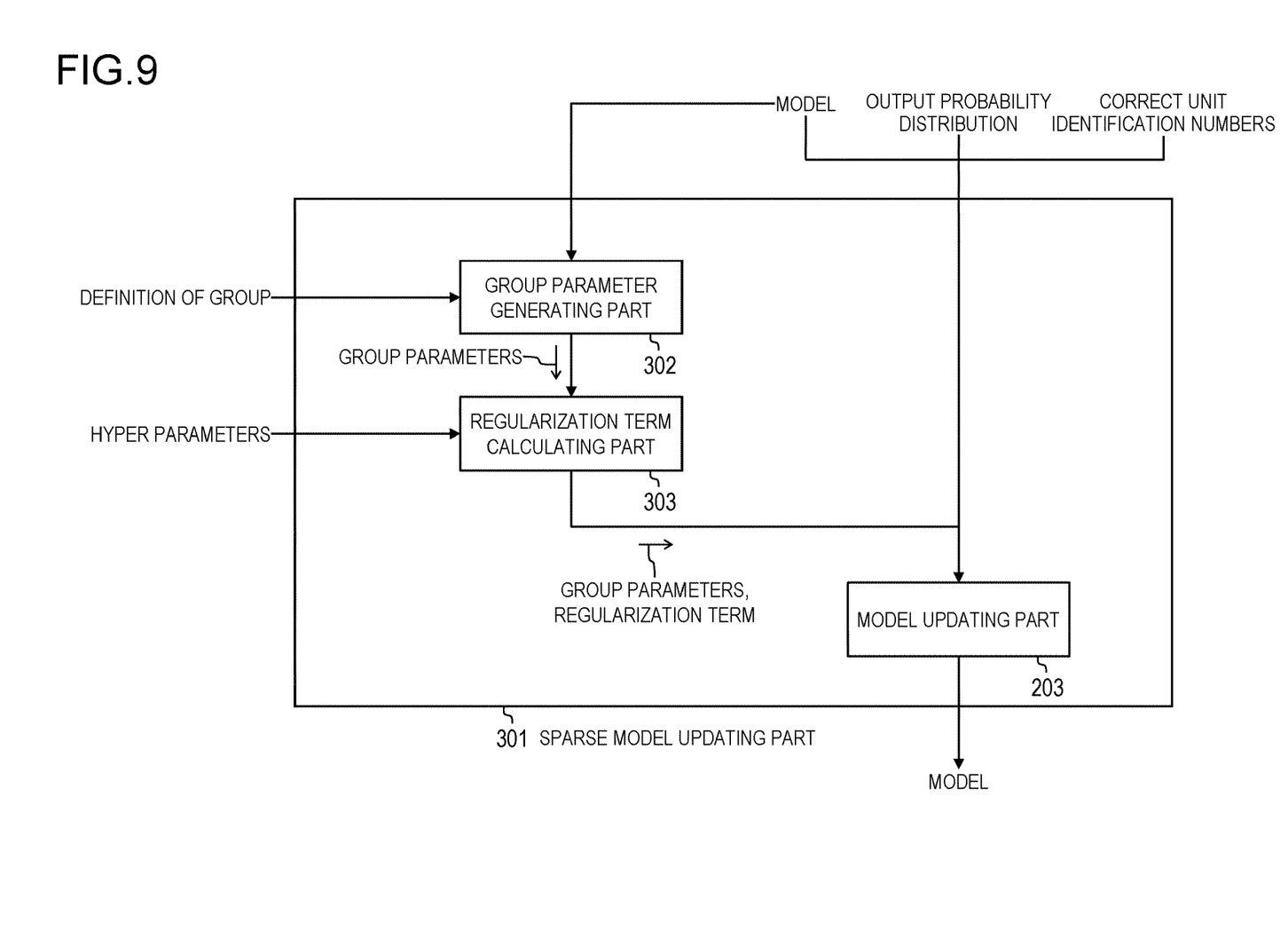
FIG. 9 is a block diagram showing a configuration of a sparse model updating part of the first embodiment.

Details of the sparse model updating part 301 will be described below with reference to FIG. 9. As shown in FIG. 9, the sparse model updating part 301 is in a configuration including a group parameter generating part 302, a regularization term calculating part 303 and the model updating part 203. The model updating part 203 executes the same operation as the component with the same name in the prior-art technique 2. An operation of each component in the sparse model updating part 301 will be described below with reference to FIG. 10.

Figure 10:
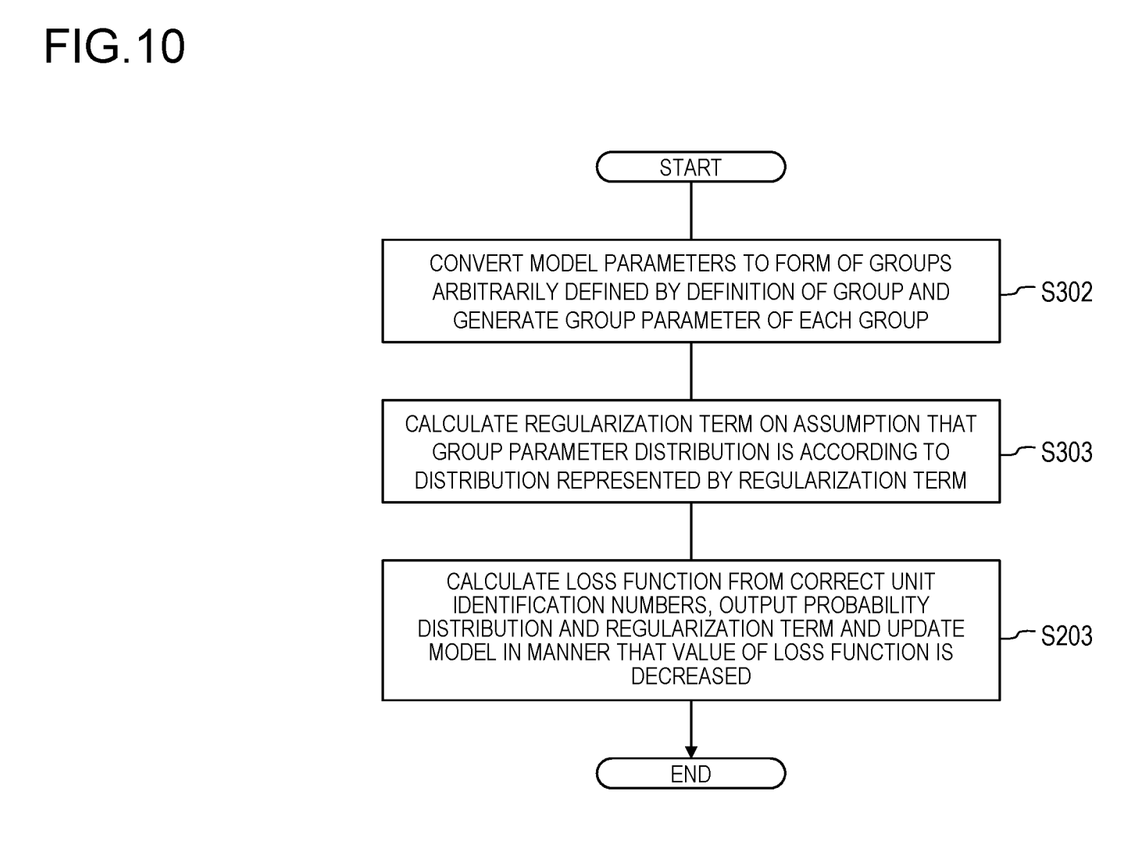
FIG. 10 is a flowchart showing an operation of the sparse model updating part of the first embodiment.

[Group Parameter Generating Part 302]

Input: the model (before being updated) and a definition of group (a specific grouping method such as grouping of each row or a column)

Output: group parameters

Process:

The group parameter generating part 302 groups model parameters of the inputted model (before being updated) into groups arbitrarily defined by the above definition of group (the specific grouping method such as grouping of each row or column) and generates group parameters indicating features of the groups (S302). In another expression, the group parameter generating part 302 defines groups by the above definition of group for the inputted model parameters, and acquires group parameters based on distributions in a group space. As a specific example of the group parameter, for example, a value of a norm of each row vector or column vector, or the like when the model parameters are a matrix, and a group is defined as a row or column in the model parameter matrix by the definition of group.

[Regularization Term Calculating Part 303]

Input: the group parameters and hyper parameters

Output: a regularization term

Process:

The regularization term calculating part 303 calculates a regularization term on an assumption that group parameter distribution is according to distribution defined by hyper parameters which are parameters defining distribution features (S303). The regularization term calculating part 303 executes a process different from the process of the regularization term calculating part 202 in a point of using a regularization term $R_{proposed}(w)$ that assumes that group parameter $w_g$ as shown below is according to the distribution.

$$R_{proposed}(w) = \sum_{g \in G} \log\left\{\sum_{j=1}^{m} \alpha_j \exp\left(\frac{(\|w_g\|_2 - \mu_j)^2}{2\sigma_j^2}\right)\right\} \quad \text{[Formula 5]}$$

Here, $w_g$ is an arbitrary parameter (for example, a norm) in a group (a vector or a matrix) that can be arbitrarily decided, and indicates an arbitrary parameter (for example, a norm) in a row vector or a column vector in the model parameter matrix according to the prior-art technique 2. Content of the curly braces in the above formula indicates Gaussian mixture distribution, and j and m indicate the number of distributions mixed in a case where group parameter distributions are assumed. A mixture weight $\alpha_j$, a mean $\mu_j$ and a variance $\sigma_j$ are hyper parameters for adjusting the group parameter distributions, and it becomes possible to adjust the amount of reduction in the model size by adjusting these hyper parameters (example: adjusting importance of parameters belonging to the mean $\mu_j$ by changing the ratio of the mixture weight $\mu_j$). Further, though Gaussian mixture distribution is assumed in the above formula, it is, actually, possible to combine arbitrary distribution other than Gaussian mixture distribution. A regularization term in the case of combining Laplace distribution and Gaussian distribution is shown below.

$$R'_{proposed}(w) = \sum_{g \in G} \log\left\{\sum_{j=1}^{m} \alpha_j \exp\left(\frac{(\|w_g\|_2 - \mu_j)^2}{2\sigma_j^2}\right) + \sum_{k=1}^{n} \beta_k \exp\left(-\frac{|\|w_g\|_2 - \mu'_k|}{\sigma'_k}\right)\right\} \quad \text{[Formula 6]}$$

The second term indicates mixed Laplace distribution, and a mixed weight $\beta_k$, a mean $\mu'_k$, and a variance $\sigma'_k$ are hyper parameters for adjusting the amount of reduction in the model size similarly to hyper parameters of the first term. Though it is shown in the above formula that it is also possible to use Laplace distribution having non-differentiable points, it is desirable to be differentiable in all sections in actual use. Lastly, a case of performing generalization using an arbitrary distribution function F(*) is shown below.

$$R''_{proposed}(w) = \sum_{g \in G} \log\left\{\sum_{j=1}^{m} \alpha_j F\left(\frac{\|w_g\| - \mu_j}{\sigma_j}\right)\right\} \quad \text{[Formula 7]}$$

A mixture weight $\alpha_j$, a mean $\mu_j$ and a variance $\sigma_j$ indicate hyper parameters of an arbitrary distribution function.

In the group regularization by Group Lasso in the prior-art technique 2, though each row or column is grouped, group parameter distribution is not assumed, and it is not possible to perform adjustment of a distribution shape and the like. In the group regularization by Group Lasso in the prior-art technique 2, the distribution shape converges in one pattern accompanying update of a model as shown in FIG. 11A. Therefore, a method of separating a group to be targeted by deletion and a group to be left is limited to one method. Therefore, since Group Lasso is capable of regularization of model parameters on the group space, but a mechanism for adjusting group parameter distribution is not defined, it is not possible to adjust a distribution size and the like, and it is impossible to adjust a quantity of unnecessary model parameters.

Figure 11B:
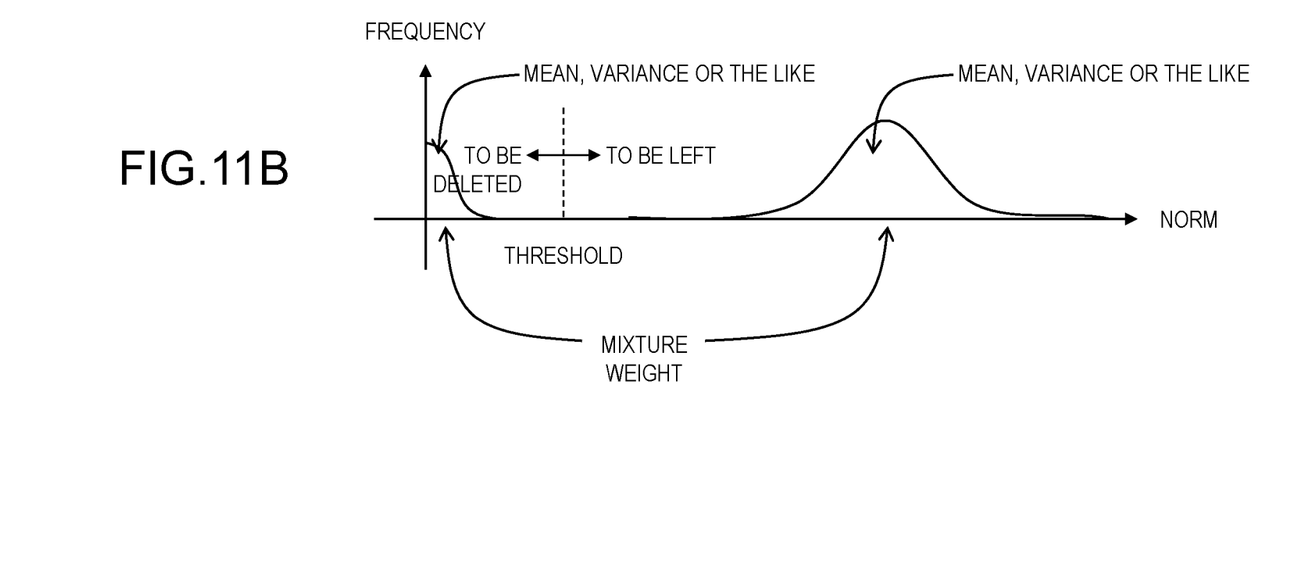
FIG. 11B shows a diagram showing an outline of model parameter deletion of the neural network learning apparatus of the first embodiment.

In comparison, in group regularization by the neural network learning apparatus 300 of the present embodiment, hyper parameters (example: the mixture weight, the mean, the variance and the like) defining features of group parameter distribution are generated as shown in FIG. 11B, and, therefore, it is possible to customize a shape of each of distributions of the group to be targeted by deletion and the group to be left, and it is possible to adjust the quantity of model parameters to be targeted by deletion.

<Effects>

By using a neural network created by the neural network learning apparatus 300 of the present embodiment, it is possible to adjust the amount of reduction in the model size, and customization such as reducing the size of a model more than Group Lasso while maintaining recognition accuracy becomes possible, which is very effective in terms of the model size and the amount of calculation in incorporating a model using the neural network into a local system.

<Supplementary Notes>

For example, as a single hardware entity, the apparatus of the present invention has an input part to which a keyboard and the like can be connected, an output part to which a liquid crystal display and the like can be connected, a communication part to which a communication device (for example, a communication cable) capable of communicating with the outside of the hardware entity can be connected, a CPU (Central Processing Unit, which may be provided with a cache memory or a register), a RAM and a ROM which are memories, an external storage device which is a hard disk, and a bus connecting the input part, the output part, the communication part, the CPU, the RAM, the ROM and the external storage device to enable exchange of data thereamong. Further, the hardware entity may be provided with a device (a drive) or the like capable of reading from/writing to a recording medium such as a CD-ROM. As a physical entity provided with such hardware resources, there are a general-purpose computer and the like.

In the external storage device of the hardware entity, programs required to realize the functions described above and data and the like required for processing of the programs are stored. (The storage is not limited to the external storage device. For example, the programs may be stored in the ROM which is a read-only storage device). Data and the like obtained by processing of the programs are appropriately stored in the RAM, the external storage device and the like.

In the hardware entity, each program and data required for processing of each of the program, which are stored in the external storage device (or the ROM or the like), are read into the memory as necessary, and interpretation, execution and processing are appropriately performed by the CPU. As a result, the CPU realizes predetermined functions (each of the components represented above as . . . part, . . . means or the like).

The present invention is not limited to the above embodiment but can be appropriately changed within a range not departing from the spirit of the present invention. Further, the processes described in the above embodiment are not only executed in time series in order of the description but may also be executed in parallel or individually according to the processing capability of the apparatus that executes the processes or as necessary.

In the case of realizing the processing functions of the hardware entity (the apparatus of the present invention) described in the above embodiment by a computer as already stated, processing content of the functions that the hardware entity should have is written in a program. Then, by executing the program on the computer, the above processing functions of the hardware entity are realized on the computer.

The program in which the processing content is written can be recorded in a computer-readable recording medium. As the computer-readable recording medium, anything, for example, a magnetic recording device, an optical disk, a magneto-optical recording medium or a semiconductor memory is possible. Specifically, for example, a hard disk device, a flexible disk, a magnetic tape or the like can be used as the magnetic recording device; a DVD (Digital Versatile Disc), a DVD-RAM (Random Access Memory), a CD-ROM (Compact Disc Read Only Memory), a CD-R (Recordable)/RW (ReWritable) or the like can be used as the optical disk; an MO (Magneto-Optical disc) or the like can be used as the magneto-optical recording medium; and an EEP-ROM (Electronically Erasable and Programmable-Read Only Memory) or the like can be used as the semiconductor memory.

Further, distribution of the program is performed, for example, by performing sales, transfer, lending or the like of a portable recording medium, such as a DVD or a CD-ROM, in which the program is recorded. Furthermore, a configuration is also possible in which the program is distributed by storing the program in a storage device of a server computer and transferring the program from the server computer to other computers via a network.

For example, a computer that executes such a program first stores the program recorded in a portable recording medium or transferred from a server computer into its own storage device once. Then, at the time of executing processing, the computer reads the program stored in its own storage medium and executes the processing according to the read program. Further, as another execution form of the program, a computer may read the program directly from a portable recording medium and execute processing according to the program. Furthermore, each time a program is transferred to the computer from the sever computer, the computer may sequentially execute processing according to the received program. Further, a configuration is also possible in which the above processing is executed by a so-called ASP (Application Service Provider) type service in which, without transferring the program from the server computer to the computer, the processing functions are realized only by an instruction to execute the program and acquisition of a result. Note that it is assumed that the program in this form includes information which is provided for processing by an electronic calculator and is equivalent to a program (data and the like which is not a direct command to the computer but has a nature of specifying processing of the computer).

Further, though it is assumed in this form that the hardware entity is configured by causing a predetermined program to be executed on a computer, at least a part of the processing content may be realized as hardware.

What is claimed is:

1. A neural network learning apparatus comprising:
a group parameter generating processing circuitry executing operations comprising:
grouping model parameters of a neural network model into arbitrarily defined groups of model parameters, and
generating, as training data, group parameters indicating features of respective groups of the groups of model parameters, wherein the neural network model, after being trained by machine learning, includes a neural network that predicts a label based on an output probability distribution as output data from input data according to trained hyper parameters in the neural network;
a regularization term calculating processing circuitry executing operations comprising:
calculating a regularization term, as regularized training data, on an assumption that distribution of the group parameters is according to distribution defined by hyper parameters which are parameters defining distribution features; and
a model updating processing circuitry executing operations comprising:
calculating a loss function from:
correct labels in teacher data,
output probability distribution obtained by inputting feature values corresponding to the correct labels in the teacher data to the neural network model, and
the regularization term as the regularized training data, and
updating the neural network model, as training the hyper parameters in the neural network, in a manner that a value of the loss function is decreased.

2. The neural network learning apparatus according to claim 1, wherein the model parameters are a matrix, the groups are rows or columns of the matrix of the model parameters, and the group parameters are norms of row vectors or column vectors.

3. The neural network learning apparatus according to claim 1, wherein the hyper parameters include at least any one of a mixture weight, a mean and a variance.

4. The neural network learning apparatus according to claim 1, wherein a mean of distribution of necessary group parameters to set to a value that exceeds a threshold and set a mean of distribution of unnecessary group parameters to 0.

5. A non-transitory computer readable medium storing a computer program that makes a computer function as the neural network learning apparatus according to claim 1.

6. A neural network learning method that a neural network learning apparatus executes, the neural network learning method comprising the steps of:
   grouping model parameters of a neural network model into arbitrarily defined groups of model parameters;
   generating as training data, group parameters indicating features of respective groups of the groups of model parameters, wherein the neural network model after being trained by machine learning includes a neural network that predicts a label based on an output probability distribution as output data from input data according to trained hyper parameters in the neural network;
   calculating a regularization, as regularized training data, term on an assumption that distribution of the group parameters is according to distribution defined by hyper parameters which are parameters defining distribution features; and
   calculating a loss function from:
      correct labels in teacher data,
      output probability distribution obtained by inputting feature values corresponding to the correct labels in the teacher data to the neural network model, and
      the regularization term as the regularized training data; and
   updating the neural network model in a manner that a value of the loss function is decreased.

7. The neural network learning method according to claim 6, wherein the model parameters are a matrix, the groups are rows or columns of the matrix of the model parameters, and the group parameters are norms of row vectors or column vectors.

8. The neural network learning method according to claim 6, wherein the hyper parameters include at least any one of a mixture weight, a mean and a variance.

* * * * *